United States Patent
Tharp et al.

(10) Patent No.: US 8,074,334 B2
(45) Date of Patent: Dec. 13, 2011

(54) MODULAR RATCHET CAP

(75) Inventors: Robert Daniel Tharp, Sussex, WI (US); Michael Joseph Holz, West Bend, WI (US); Thomas John Graham, Delafield, WI (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 1332 days.

(21) Appl. No.: 11/624,709

(22) Filed: Jan. 19, 2007

(65) Prior Publication Data

US 2007/0170187 A1 Jul. 26, 2007

Related U.S. Application Data

(60) Provisional application No. 60/760,670, filed on Jan. 20, 2006, provisional application No. 60/760,613, filed on Jan. 20, 2006, provisional application No. 60/760,674, filed on Jan. 20, 2006, provisional application No. 60/862,077, filed on Oct. 19, 2006, provisional application No. 60/862,074, filed on Oct. 19, 2006.

(51) Int. Cl.
*B23P 11/00* (2006.01)
*B65D 51/16* (2006.01)

(52) U.S. Cl. ............ 29/428; 29/453; 29/469; 220/367.1; 220/375; 220/303

(58) Field of Classification Search .................... 29/450, 29/453, 469, 434, 428; 220/288, 303, 324, 220/325, 367.1, 375
See application file for complete search history.

(56) References Cited

U.S. PATENT DOCUMENTS

| 738,917 | A | | 9/1903 | Kempien |
|---|---|---|---|---|
| 1,509,796 | A | * | 9/1924 | Tokuhisa ...................... 220/300 |
| 1,694,030 | A | | 12/1928 | Bean |
| 1,702,205 | A | | 2/1929 | Freedman |
| 1,702,532 | A | | 2/1929 | Boomer et al. |
| 2,070,692 | A | | 2/1937 | Stone |
| 2,308,892 | A | | 1/1943 | Miller |
| 2,681,559 | A | | 6/1954 | Friend |
| 2,696,100 | A | | 12/1954 | Nehls |
| 2,816,433 | A | | 12/1957 | Friend |
| 2,820,565 | A | | 1/1958 | Oberle |
| 3,136,148 | A | | 6/1964 | Nehls |

(Continued)

FOREIGN PATENT DOCUMENTS

CN 1060741 4/1992

(Continued)

*Primary Examiner* — Essama Omgba
(74) *Attorney, Agent, or Firm* — Michael Best & Friedrich LLP

(57) ABSTRACT

A method of assembling selected modular ratchet cap assemblies. In one aspect, the method includes the acts of providing identical threaded portions, providing identical cover portions, providing a first vent module, providing a second vent module different from the first vent module, selecting the first vent module and coupling together the first vent module with one of the identical threaded portions and one of the identical cover portions to form a first cap assembly, and selecting the second vent module and coupling together the second vent module with another one of the identical threaded portions and another one of the identical cover portions to form a second cap assembly. In other aspects, the method includes assembling first and second cap assemblies with identical cover portions and threaded portions, but having different pawl members providing different cap-installing torque limits. In other aspects, the method includes providing first and second cap assemblies with similar components, but having covers or portions thereof provided with different individualized characteristics for different applications.

8 Claims, 10 Drawing Sheets

U.S. PATENT DOCUMENTS

| | | | |
|---|---|---|---|
| 3,343,697 A | 9/1967 | Roberts et al. | |
| 3,373,894 A | 3/1968 | Johnson | |
| 3,426,932 A | 2/1969 | Rouse | |
| 3,748,829 A | 7/1973 | Joyce et al. | |
| 3,918,602 A | 11/1975 | McIntosh | |
| 3,945,454 A | 3/1976 | Kinoshita et al. | |
| 3,950,973 A | 4/1976 | Grasnianski | |
| 3,986,634 A * | 10/1976 | Smith et al. | 220/288 |
| 3,998,078 A | 12/1976 | Detwiler | |
| 4,000,632 A | 1/1977 | Summan | |
| 4,000,633 A | 1/1977 | Evans | |
| 4,013,191 A | 3/1977 | Gerdes | |
| 4,037,747 A * | 7/1977 | Acton et al. | 215/219 |
| 4,083,209 A | 4/1978 | Sloan, Jr. | |
| 4,107,960 A | 8/1978 | Neiman | |
| 4,107,961 A * | 8/1978 | Evans | 70/165 |
| 4,132,091 A | 1/1979 | Aro et al. | |
| 4,164,302 A | 8/1979 | Gerdes | |
| 4,223,799 A | 9/1980 | Eyster et al. | |
| 4,231,240 A | 11/1980 | Fujita et al. | |
| 4,245,751 A | 1/1981 | Neiman | |
| 4,280,346 A | 7/1981 | Evans | |
| 4,280,347 A | 7/1981 | Evans | |
| 4,294,376 A | 10/1981 | Keller | |
| 4,299,102 A | 11/1981 | Aro | |
| 4,342,208 A | 8/1982 | Evans | |
| 4,376,492 A | 3/1983 | Bartel et al. | |
| 4,453,388 A | 6/1984 | Baker et al. | |
| 4,468,058 A | 8/1984 | Haagen et al. | |
| 4,485,647 A | 12/1984 | Matthews | |
| 4,527,406 A * | 7/1985 | Baker | 70/165 |
| 4,579,244 A | 4/1986 | Fukuta | |
| 4,592,218 A | 6/1986 | Chechovsky et al. | |
| 4,676,390 A | 6/1987 | Harris | |
| 4,690,292 A | 9/1987 | Henning | |
| 4,706,841 A | 11/1987 | Grajek | |
| 4,754,627 A | 7/1988 | Butler, III | |
| 4,765,505 A | 8/1988 | Harris | |
| 4,775,061 A | 10/1988 | Coote | |
| 4,779,755 A | 10/1988 | Harris | |
| 4,809,869 A | 3/1989 | Cosgrove et al. | |
| 4,830,058 A | 5/1989 | Harris | |
| 4,830,213 A | 5/1989 | Sleder | |
| 4,867,337 A * | 9/1989 | Eichenseer | 220/375 |
| 4,872,587 A * | 10/1989 | Zimmermann et al. | 220/375 |
| 4,881,597 A | 11/1989 | Hensley | |
| 4,887,733 A | 12/1989 | Harris | |
| 4,892,216 A | 1/1990 | Scott | |
| 4,978,027 A | 12/1990 | Larson | |
| 4,984,698 A | 1/1991 | Stuckey | |
| 5,000,339 A | 3/1991 | Wheat et al. | |
| 5,027,932 A * | 7/1991 | Graffin | 192/56.31 |
| 5,031,790 A * | 7/1991 | Keller | 220/203.2 |
| 5,042,678 A | 8/1991 | Munguia | |
| 5,108,001 A | 4/1992 | Harris | |
| 5,110,003 A | 5/1992 | MacWilliams | |
| 5,167,340 A | 12/1992 | Shaw | |
| 5,171,439 A | 12/1992 | Vakharia | |
| 5,183,173 A * | 2/1993 | Heckman | 220/203.07 |
| 5,212,971 A | 5/1993 | Yoon et al. | |
| 5,381,919 A | 1/1995 | Griffin et al. | |
| 5,449,086 A | 9/1995 | Harris | |
| 5,462,190 A * | 10/1995 | Lienhart et al. | 220/375 |
| 5,467,621 A | 11/1995 | Gravino | |
| 5,520,300 A | 5/1996 | Griffin | |
| 5,540,347 A | 7/1996 | Griffin | |
| 5,638,975 A | 6/1997 | Harris | |
| 5,720,328 A * | 2/1998 | Ott | 141/312 |
| 5,732,841 A | 3/1998 | Jocic et al. | |
| 5,791,507 A | 8/1998 | Harris et al. | |
| 5,794,806 A | 8/1998 | Harris et al. | |
| 5,904,057 A | 5/1999 | Abney, III et al. | |
| 5,924,590 A | 7/1999 | Jocic et al. | |
| 5,985,002 A | 11/1999 | Grantham | |
| 5,992,669 A | 11/1999 | Hagano et al. | |
| 5,992,672 A | 11/1999 | Hagano et al. | |
| 6,035,906 A * | 3/2000 | Ott | 141/312 |
| 6,056,140 A | 5/2000 | Muth et al. | |
| 6,079,582 A * | 6/2000 | Nickel et al. | 220/238 |
| 6,095,363 A * | 8/2000 | Harris et al. | 220/203.26 |
| 6,109,467 A | 8/2000 | Schniemann | |
| RE36,959 E | 11/2000 | Griffin | |
| 6,173,855 B1 * | 1/2001 | Stark | 220/295 |
| 6,179,148 B1 * | 1/2001 | Harris | 220/288 |
| 6,193,093 B1 | 2/2001 | Brunner | |
| 6,202,879 B1 * | 3/2001 | Gericke | 220/255 |
| 6,202,901 B1 | 3/2001 | Gerber et al. | |
| 6,220,064 B1 | 4/2001 | Oddenino | |
| 6,230,918 B1 | 5/2001 | Huynh et al. | |
| 6,231,106 B1 | 5/2001 | Nagasaka | |
| 6,293,996 B1 | 9/2001 | Grantham et al. | |
| 6,364,145 B1 * | 4/2002 | Shaw et al. | 220/203.11 |
| RE37,776 E | 7/2002 | Foltz | |
| 6,415,941 B1 | 7/2002 | Huse | |
| 6,478,360 B1 | 11/2002 | Reutter | |
| 6,562,110 B2 | 5/2003 | Koros et al. | |
| 6,579,342 B2 | 6/2003 | Wang et al. | |
| 6,585,802 B2 | 7/2003 | Koros et al. | |
| 6,626,157 B2 | 9/2003 | Perry | |
| 6,651,707 B2 | 11/2003 | Zimmer et al. | |
| 6,662,978 B2 * | 12/2003 | Lin et al. | 222/509 |
| 6,681,949 B2 * | 1/2004 | Tibor | 220/288 |
| 6,685,045 B1 | 2/2004 | Palvolgyi | |
| 6,688,146 B2 | 2/2004 | Michels et al. | |
| 6,701,952 B1 | 3/2004 | Ehrman et al. | |
| 6,705,267 B1 | 3/2004 | Westerbeke, Jr. et al. | |
| 6,763,966 B2 * | 7/2004 | Harris | 220/293 |
| 6,779,544 B2 | 8/2004 | Devall | |
| 6,782,911 B2 | 8/2004 | DeCapua et al. | |
| 6,796,451 B2 | 9/2004 | Harris | |
| 6,895,943 B1 | 5/2005 | Taxon | |
| 6,935,527 B1 | 8/2005 | Brock | |
| 6,942,124 B2 | 9/2005 | Dehn et al. | |
| 6,953,496 B2 | 10/2005 | Grantham et al. | |
| 6,981,532 B2 | 1/2006 | Dehn et al. | |
| RE38,991 E * | 2/2006 | Shaw et al. | 220/203.11 |
| 7,025,222 B2 * | 4/2006 | Hagano et al. | 220/375 |
| 7,073,681 B2 * | 7/2006 | Abe et al. | 220/375 |
| 7,281,640 B2 * | 10/2007 | Hagano et al. | 220/375 |
| 7,344,042 B2 * | 3/2008 | Hagano | 220/288 |
| 7,624,889 B2 * | 12/2009 | Tharp et al. | 220/288 |
| 2001/0052292 A1 | 12/2001 | Ito | |
| 2002/0066734 A1 * | 6/2002 | Harris | 220/304 |
| 2003/0205578 A1 * | 11/2003 | Newport | 220/304 |
| 2003/0209574 A1 * | 11/2003 | Lin et al. | 222/548 |
| 2004/0013913 A1 | 1/2004 | Fabis et al. | |
| 2005/0098160 A1 | 5/2005 | Taxon | |
| 2006/0163250 A1 * | 7/2006 | Colavita | 220/203.28 |
| 2007/0169524 A1 * | 7/2007 | Tharp et al. | 70/172 |
| 2007/0210086 A1 * | 9/2007 | Behnamrad et al. | 220/303 |
| 2009/0223959 A1 * | 9/2009 | Schulz et al. | 220/255 |

FOREIGN PATENT DOCUMENTS

| | | |
|---|---|---|
| DE | 4006465 | 9/1991 |
| DE | 9205925 | 12/1992 |
| EP | 0461852 | 12/1991 |
| EP | 1574381 | 9/2005 |
| EP | 1987976 A2 * | 11/2008 |
| FR | 1357064 | 4/1964 |
| GB | 1487489 | 9/1977 |
| WO | 9015662 | 12/1990 |
| WO | 9503949 | 2/1995 |
| WO | 0020292 | 4/2000 |

* cited by examiner

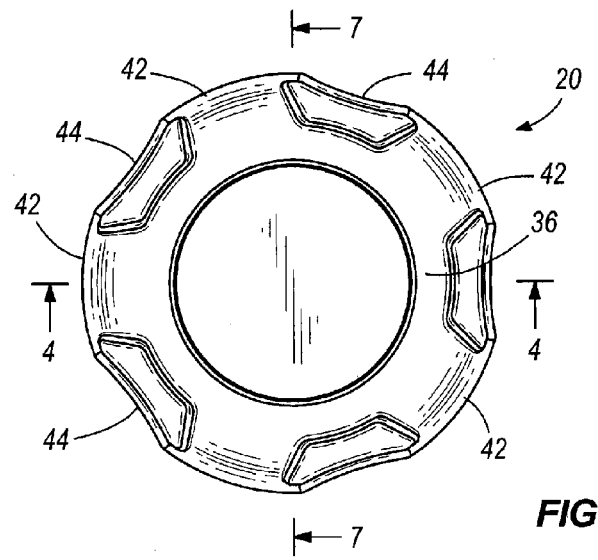
FIG. 3
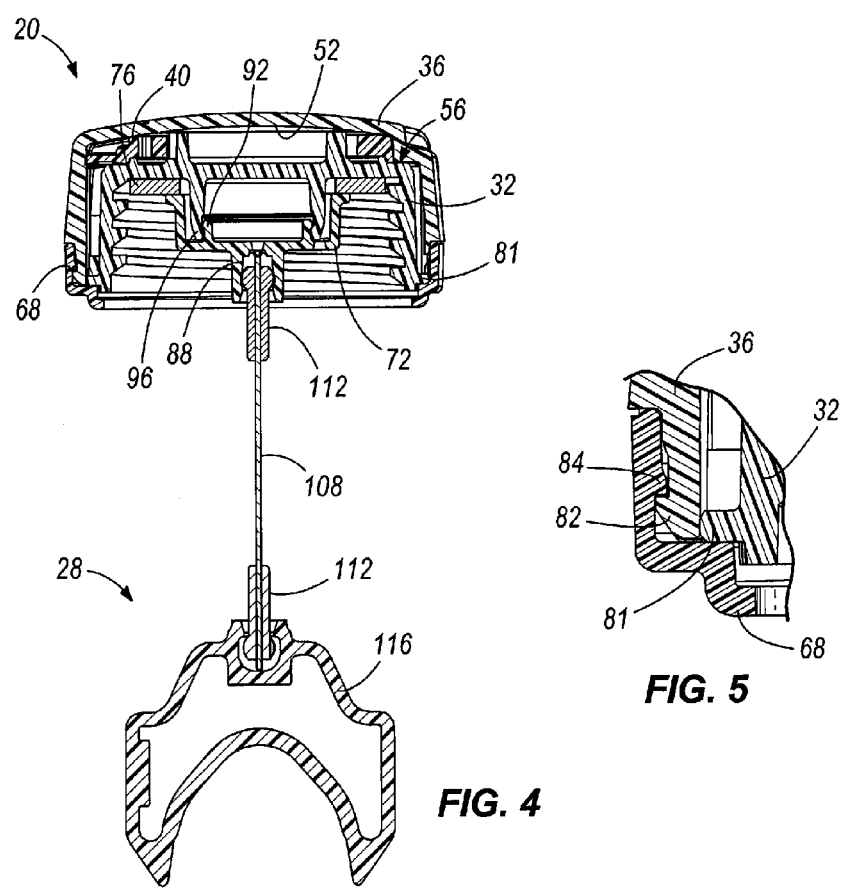
FIG. 4
FIG. 5

MODULAR RATCHET CAP

RELATED APPLICATIONS

The present application claims priority to U.S. Patent Application Ser. No. 60/760,670, filed Jan. 20, 2006, entitled VENT INCLUDING A SEPARATOR MEMBRANE, and to U.S. Patent Application Ser. No. 60/760,613, filed Jan. 20, 2006, entitled MODULAR RATCHET CAP, and to U.S. Patent Application Ser. No. 60/760,674, filed Jan. 20, 2006, entitled LOCKING CAP, and to U.S. Patent Application Ser. No. 60/862,077, filed Oct. 19, 2006, entitled LOCKING CAP, and to U.S. Patent Application Ser. No. 60/862,074, filed Oct. 19, 2006, entitled VENT INCLUDING A SEPARATOR MEMBRANE, and to U.S. patent application Ser. No. 11/624,708, filed Jan. 19, 2007, entitled LOCKING CAP, and to U.S. patent application Ser. No. 11/624,711, filed Jan. 19, 2007, entitled VENT INCLUDING A SEPARATOR MEMBRANE, the entire contents of all of which are hereby incorporated by reference.

FIELD OF THE INVENTION

The present invention relates to caps for closing respective openings, such as a filling tube of a fuel tank and, more particularly the invention relates to modular cap assemblies.

SUMMARY OF THE INVENTION

In independent aspects and in some constructions, the invention provides modular cap assemblies for closing openings, such as a threaded filling tube on a fuel tank.

Independent features and independent advantages of the present invention will become apparent to those skilled in the art upon review of the detailed description and drawings.

BRIEF DESCRIPTION OF THE DRAWINGS

FIG. 3 is a top view of the cap of FIG. 1;

FIG. 4 is a first cross-sectional view of the cap of FIG. 1, taken along line 4-4 of FIG. 3.

FIG. 5 is a first detail view of mating portions of the cap as shown in FIG. 4;

Figure 1:
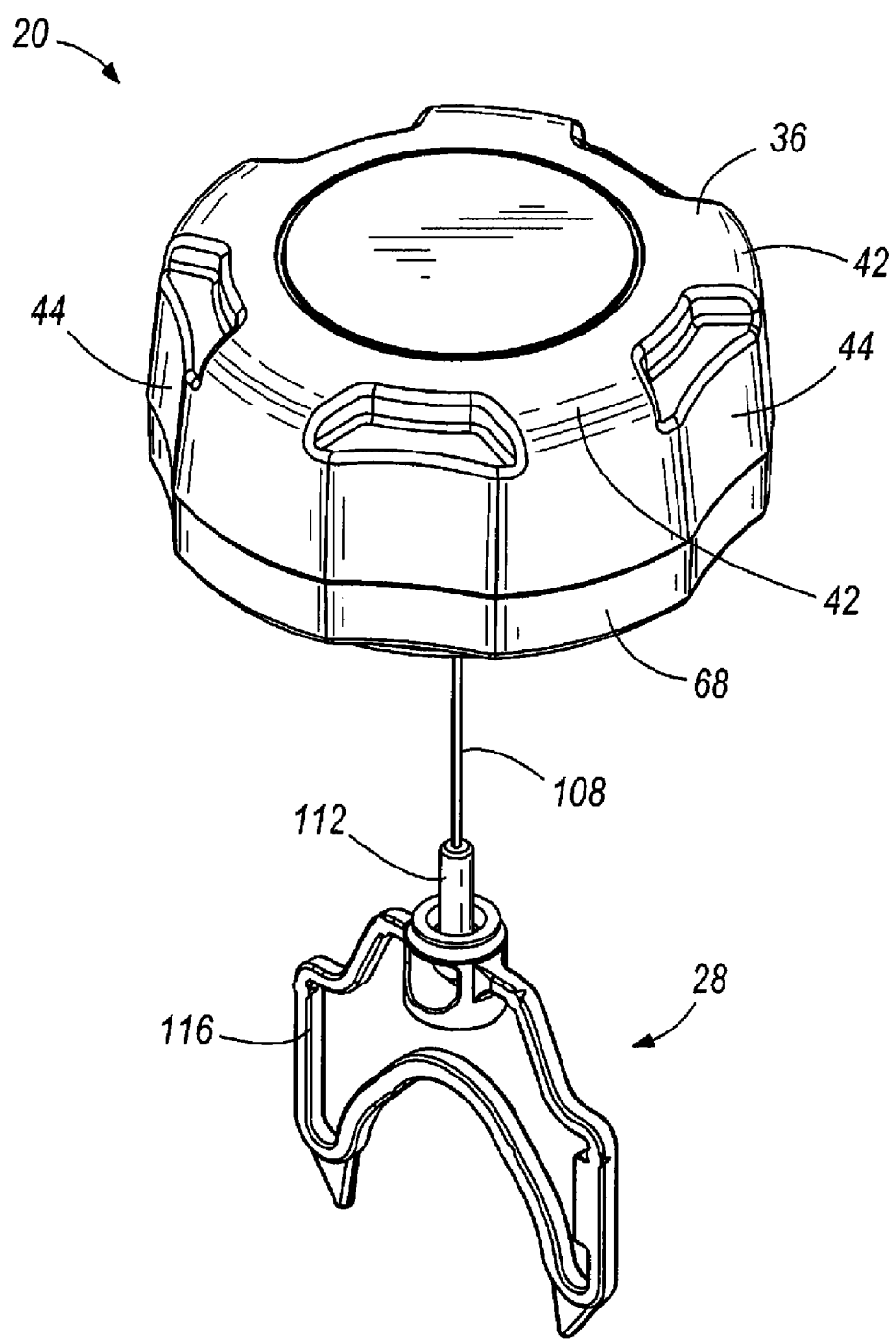
FIG. 1 is a perspective view of a first modular ratchet cap construction with a non-vented inner body.
Figure 2:
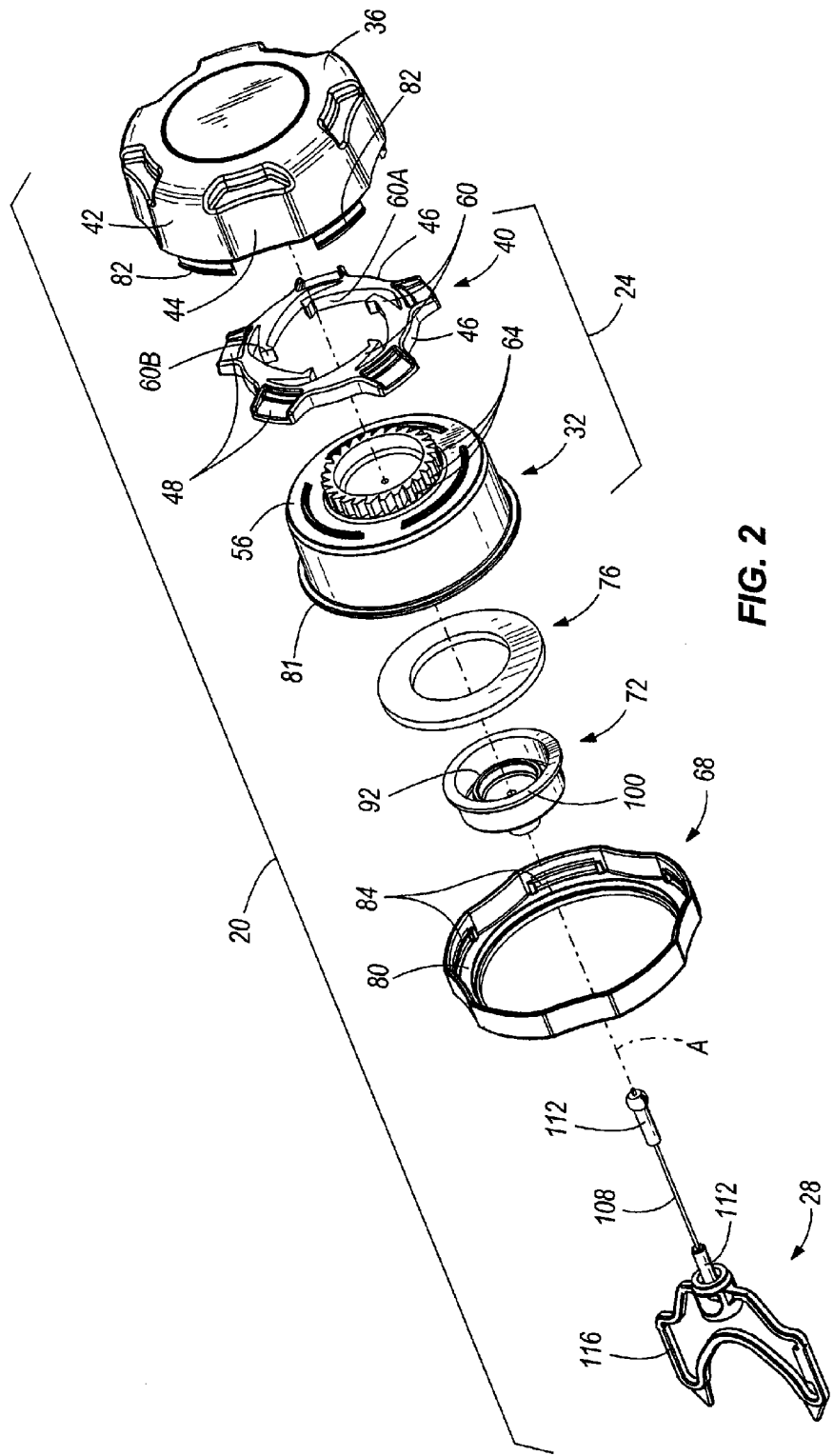
FIG. 2 is an exploded assembly view of the cap of FIG. 1.
Figure 6:
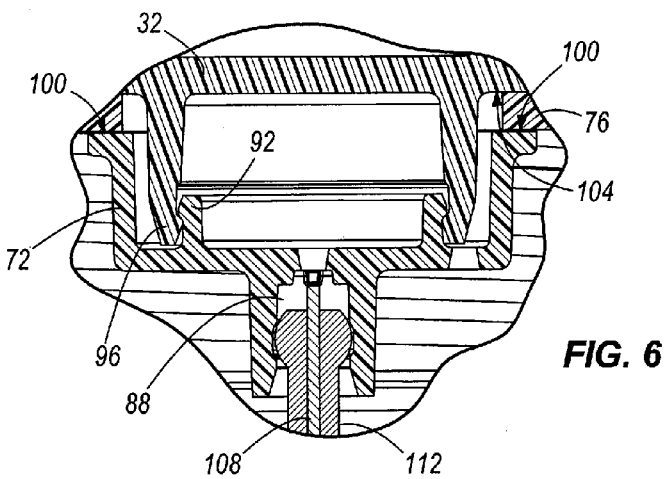
FIG. 6 is a second detail view of additional mating portions of the cap as shown in FIG. 4.
Figure 7:
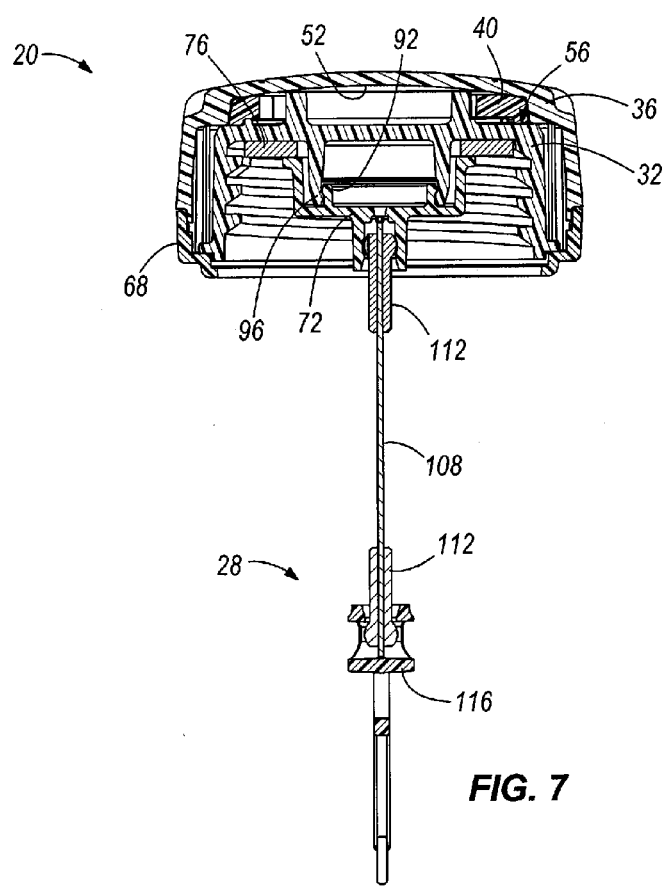
FIG. 7 is a second cross-sectional view of the cap of FIG. 1, taken along line 7-7 of FIG. 3.

Before any independent features and at least one embodiment of the invention are explained in detail, it is to be understood that the invention is not limited in its application to the details of the construction and the arrangement of the components set forth in the following description or illustrated in the drawings. The invention is capable of other embodiments and of being practiced or of being carried out in various ways. Also, it is understood that the phraseology and terminology used herein is for the purpose of description and should not be regarded as limiting.

Although references are made below to directions, such as left, right, up, down, top, bottom, front, rear, forward, back, etc., in describing the drawings, the references are made to be taken literally or to limit the present invention in any form.

The use of "including", "having", and "comprising" and variations thereof herein is meant to encompass the items listed thereafter and equivalents thereof as well as additional items. The use of letters to identify elements of a method or process is simply for identification and is not mean to indicate that the elements should be performed in a particular order.

DETAILED DESCRIPTION

In independent aspects and in the illustrated constructions, modular cap assemblies are provided. In some constructions, a cap assembly generally includes components which are common to multiple cap configurations and which are used with substitutable components to provide a desired cap configuration (e.g., ratchet cap, locking cap, cap with vent, cap with carbon canister, cap with tether (of various lengths), combinations of one or more of such components, etc), a desired cap size (e.g., for use with a given size threaded opening with or without such additional substitutable components), a desired cap appearance (e.g., color(s) to meet end operator requirements, various indicators on cap components, etc.), etc. In some constructions, a cap assembly may include replaceable components such that if, for example, a component is worn or damaged (e.g., a ratchet assembly, a locking mechanism, a seal/gasket, etc.), that component may be easily replaced (by the operator, a service center, the manufacturer, etc.) without requiring replacement of the entire cap assembly, or necessarily any of the other components thereof.

A first modular cap assembly 20, which shown in FIGS. 1-7, includes a ratchet assembly 24 and a tether assembly 28. The cap assembly 20 has a threaded portion 32 (i.e., "inner body"), which is able to be tightened onto a threaded opening up to a predetermined torque limit via the ratchet assembly 24. In the illustrated construction, the ratchet assembly 24 limits the amount of torque in the tightening direction (e.g., when the cap assembly 20 is installed) transmitted to the threaded portion 32 to, for example, prevent over-tightening of the cap assembly 20, prevent damage to the threaded potion 32, provide audible and/or tactile feedback to the user that a sufficient level of torque (e.g., at or greater than a minimum retention torque) has been achieved, etc. Also, in the illustrated construction, the ratchet assembly 24 does not limit the amount of torque in the removal direction (e.g., when the cap assembly 20 is removed). The tether assembly 28 in some embodiments for usage on vehicles are regulated by federal qualify the cap assembly 20 in some embodiments for usage on vehicles as regulated by federal and state transportation and environmental laws (e.g., 2007 California state regulations and EPA 2010 regulations).

The cap assembly 20 includes a cover portion 36, the threaded portion 32, and a pawl member 40 between the cover portion 36 and the threaded portion 32. The pawl member 40 is ring-shaped and is rotatable with the cover portion 36. The cover portion 36 includes recesses 42 and projections 44 (as perceived from the inside of the cover portion 36), and the pawl member 40 includes recesses 46 and projections 48 (see FIG. 2) that inter-engage with the recesses 42 and projections 44 of the cover portion 36 to provide the rotational connection therewith. In the illustrated construction, the recess 42 and the projections 44 on the cover portion 36 are incorporated into the appearance and/or function of the cover portion 36 (e.g., the outer profile or grasp surface of the cover portion 36 corresponds to the recesses 42 and the projections 44 on the inside of the cover portion 36).

The pawl member 40 is positioned between a lower-facing surface 52 of the cover portion 36 and an upper-facing surface 56 of the threaded portion 32. Pawl arms 60 on the pawl member 40 engage pawl teeth 64 on the threaded portion 32 to transmit torque from the cover portion 36 through the pawl member 40 to the threaded portion 32. If the torque exceeds a predetermined torque amount (determined at least in part by the construction of the pawl arms 60), the pawl arms 60 flex and ride over the associated pawl teeth 64 such that the pawl member 40 and the cover portion 36 rotate relative to the threaded portion 32, and the torque-transmitting connection between the cover portion 36 to the threaded portion 32 is at least momentarily disengaged.

The operator is able to loosen or un-twist the cap assembly 20 from the mating part threaded opening, not shown) by gripping the outer profile of the cover portion 36 and twisting, for example, in a counter-clockwise direction. Under this torque load, the pawl member 40 is turned directly by the cover portion 36 through the five recesses 46 and protrusions 48 on the pawl member 40, which engage the recesses 42 and protrusions 44 of the cover portion 36.

In the illustrated construction, the pawl member 40 includes five pawl arms 60, which engage the pawl teeth 64 on the threaded portion 32. Each pawl arm 60 includes a resistant portion 60A and an engagement portion 60B. The engagement portions 60B of the pawl arms 60 are designed to engage definitely (i.e., without slip) under counter-clockwise rotation (e.g., when removing the cap assembly 20 from the mating part) of the cover portion 36 by the operator. The engagement portions 60B of the pawl arms 60 are further designed to provide torque-limited ratchet action under clockwise rotation (e.g., when installing the cap assembly 20 on the mating part) of the cover portion 36 by the operator. When the predetermined torque limit is reached during tightening of the cap assembly 20 by the operator, the pawl arms 60 will deflect from the pawl teeth 64 on the threaded portion 32 and allow the cover portion 36 to rotate relative to the threaded portion 32, altering the user that an acceptable amount of torque (i.e., the predetermined torque limit) has been reached and protecting the threaded portion 32 from further tightening and potential damage from over-tightening. In the illustrated construction, the pawl arms 60 deflect generally radially inward toward a central axis A of the cap assembly 20 such that the pawl arms 60, regardless of whether or not they are deflecting, are always lying in the same plane transverse to the central axis A.

In the illustrated construction, the cap assembly 20 also includes an assembly ring 68, a retainer 72, and a gasket 76. The retainer 72 snaps together with the threaded portion 32 and provides an attachment location for the tether assembly 28 (if the tether assembly 28 is desired for the particular cap assembly 20 as shown in at least FIGS. 1, 2, 4, and 7). The assembly ring 68 is disposed at a lower end of the cover portion 36 and snaps together with the cover portion 36 in a position so as to provide a retaining surface 80 for fixing the threaded portion 32 axially with respect to the cover portion 32. A projection 81 (e.g., a radially outwardly extending annular wall) on the threaded portion 32 is engaged by the retaining surface 80. The cover portion 36 and the assembly ring 68 include respective mating portions 82 and 84 (see FIGS. 2, 4, and 5) that snap together with each other, effectively coupling the cover portion 36 and the threaded portion 32 together.

FIGS. 4-7 illustrate the cap assembly 20 in section views, showing the relationships between mating parts and the positioning of all the elements. In the illustrated cap assembly 20, the tether assembly 28 is snapped into an opening 88 in the retainer 72, and the retainer 72 holds the tether assembly 28 to the remainder of the cap assembly 20. Specifically, the retainer 72 includes a projection 92 (e.g., an annular wall with a barbed edge) that snaps together with a projection 96 (e.g., an annular wall with a barbed edge) on the threaded portion 32. When the retainer 72 is engaged with the threaded portion 32, the gasket 76 is held fixed between an upper-facing surface 100 of the retainer 72 and a lower-facing surface 104 of the threaded portion 32. The tether assembly 28 is provided to retain the cap assembly 20 with an associated structure (e.g., the mating part). The tether assembly 28 includes a tether 108 having a particular length, a pair of coupling portions 112, and an end portion 116 providing a particular type of interface with the mating part. The tether provides protection against losing the cap when removed and it also reminds the operator to re-secure the cap for example, after filling the tank, as the cap hangs off of the tank.

In other constructions (not shown), the tether assembly 28 is substituted with another different tether assembly (e.g., having a different length and/or interface type, etc.). The tether assembly 28 may be replaced (e.g., if worn, damaged, etc.) or may be removed altogether without affecting the construction of the cap assembly 20 in any other way. For example, alternate tether assemblies, components of which may be substituted for the tether assembly 28 illustrated in at least FIGS. 1, 2, 4, and 7, are described and illustrated in U.S. Pat. No. 4,872,587, issued Oct. 10, 1989; U.S. Pat. No. 5,165, 565, issued Nov. 24, 1992; U.S. Pat. No. 5,320,240, issued Jun. 14, 1994; and U.S. Pat. No. 6,109,467, issued Aug. 29, 2000; the entire contents of all of which are hereby incorporated by reference.

As described above, the cap assembly 20 is assembled primarily by snapping adjacent components together. As such, each portion of the cap assembly 20 that snaps together with another portion has at least one engagement portion (e.g., projection, barb, etc.). An alternate substrate part may replace a similar part of the cap assembly 20 as long as it includes the requisite engagement portion. For example, the threaded portion 32 is simply replaced by a similar-shaped part with an internal thread having a different size, pitch, etc. for conforming to industry standards or custom applications. Furthermore, the pawl member 40 and the gasket 76, which do not snap together with any other components, are also easily swapped for alternate substitute or replacement parts. For example, a new pawl member may be introduced to the cap assembly 20, the new gasket having a different cross-sectional shape or being constructed of a different material than the original gasket 76, for example.

Many additional modifications or part substitutions or replacements may also be realized, which enhance the modularity of the cap assembly 20. The assembly ring 68 is simply replaced with different color assembly rings of the same or modified shape to match with color schemes of the associated enclosure or product (e.g., fuel tank, vehicle, etc.) or to provide an indication of the system (e.g., a designation of the contents of the associated enclosure or tank) by color-coding. The cover portion 36 is simply replaced with a substitute cover portion provided with symbols, printed indicia, etc. specific to a particular application and/or manufacturer as discussed further below.

Figure 8:
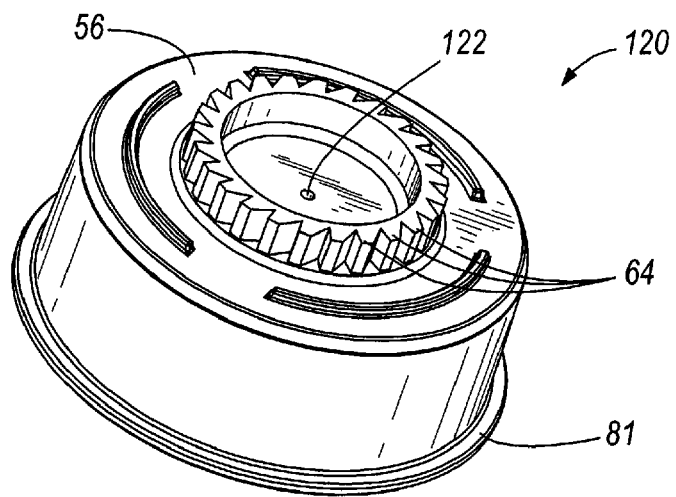
FIG. 8 is a vented inner body for optional direct replacement of the non-vented inner body shown in at least FIGS. 2, 4, 6, and 7.

FIG. 8 illustrates a vented threaded portion 120 for direct substitution in place of the threaded portion 32, which is non-vented. The vented threaded portion 120 includes a vent aperture 122 establishing a flow passage for air between the inside of the threaded portion 120 and the outside of the cap assembly 20 (i.e., air may come in or be expelled between the cover portion 36 and the threaded portion 120 adjacent the assembly ring 68. Other features of the threaded portion 120 remain as shown and described above. In alternate embodiments, the venting configuration may include components which are similar to a venting structure described and illustrated in U.S. patent application Ser. No. 60/760,670, filed Jan. 20, 2006, U.S. patent application Ser. No. 60/862,074, filed Oct. 19, 2006, and U.S. patent application Ser. No. 11/624,711, filed Jan. 19, 2007, the entire contents of which are hereby incorporated by reference.

In some independent aspects and in some constitution, the threaded portion 120 may integrate a carbon canister. The cap assembly 20 may include structure which is similar to the canister structure desired and illustrated in U.S. patent application Ser. No. 11/058,063, filed Feb. 14, 2005, now Publication No. 2006/0011173 A1, published Jan. 19, 2006, the entire contents of which are hereby incorporated by reference.

In some independent aspects and in some constructions, the cap assembly 20 may include a locking mechanism operable between a locked condition, in which the cap is inhibited from being removed from the mating part, and an unlocked condition, in which the cap is removable from the mating part. The locking mechanism may include components which are similar to components of the locking cap described and illustrated in U.S. patent application Ser. No. 60/760,674, filed Jan. 20, 2006, U.S. patent application Ser. No. 60/862,077, filed Oct. 19, 2006, and U.S. patent application Ser. No. 11/624,708, filed Jan. 19, 2007, the entire contents of which are hereby incorporated by reference.

In some independent aspects and in some constructions, the cover portion 36 is provided with an interchangeable top surface to allow internal features to protrude through (e.g., a portion of a locking mechanism, a vent, etc.). The interchangeable top surface may also be provided with varying graphics, indicia, etc., based on, for example, the tank contents, manufacturer/operator requirements, etc., or may provide other imprinted information for the operator.

Figure 9:
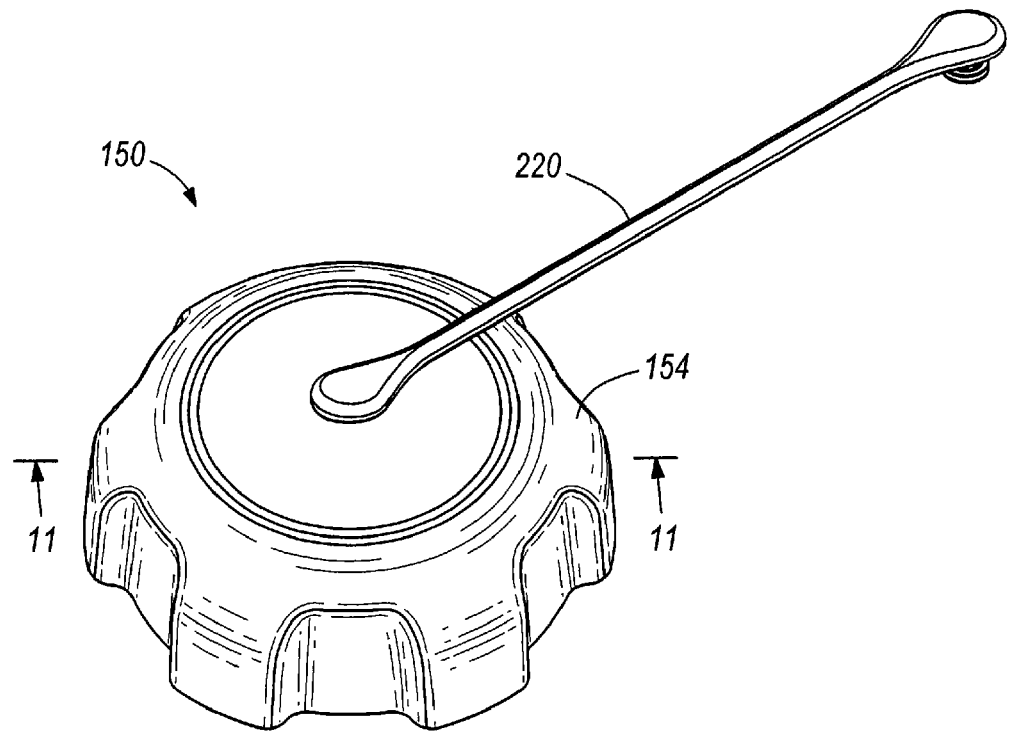
FIG. 9 is a perspective view of a second modular ratchet cap construction having a first type of vent module.
Figure 10:
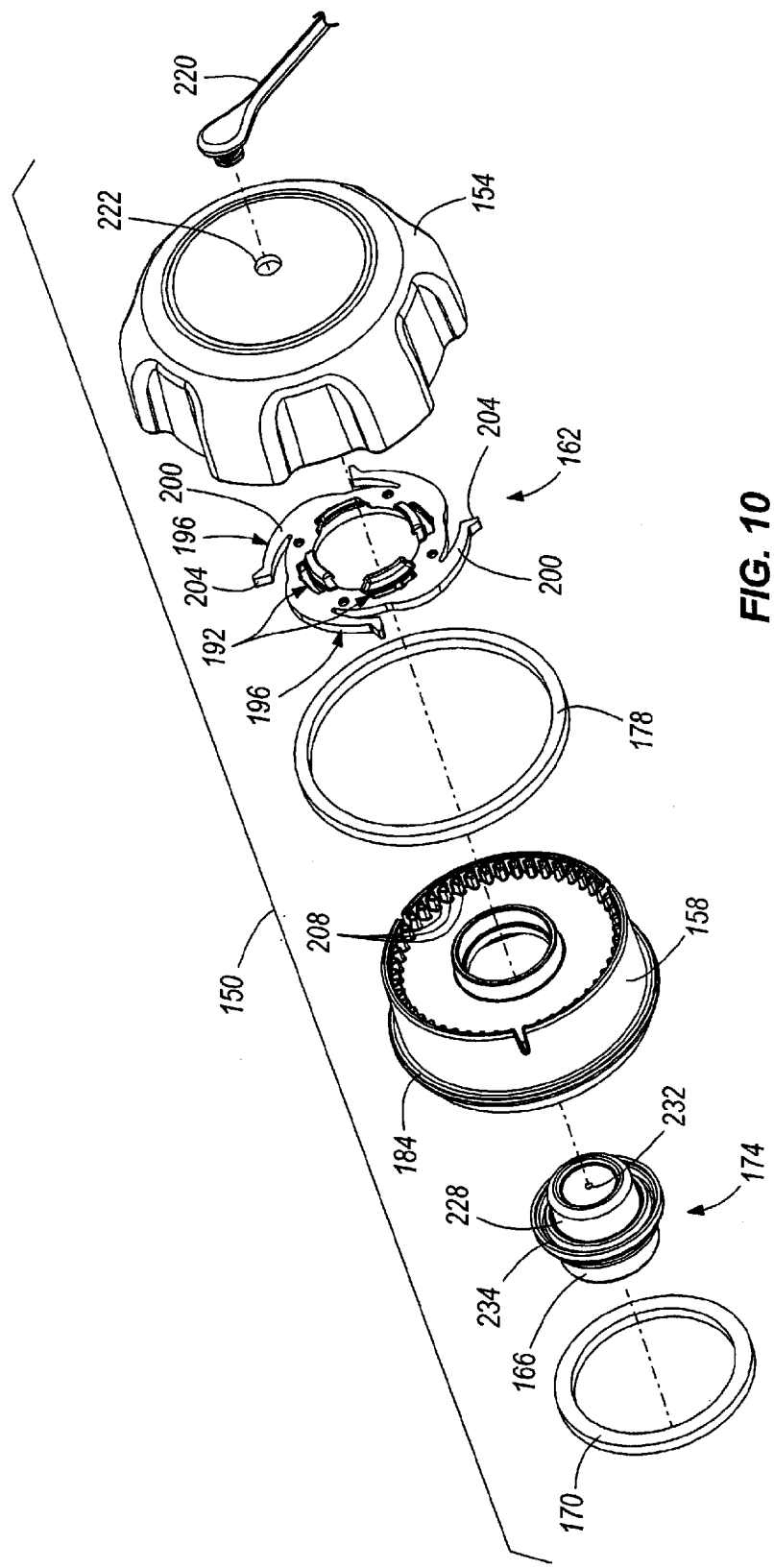
FIG. 10 is an exploded assembly view of the cap of FIG. 9.
Figure 11:
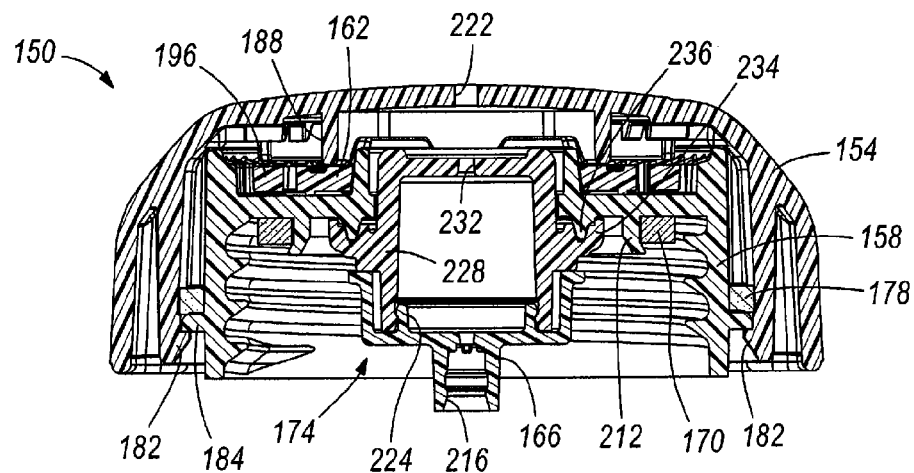
FIG. 11 is a cross-sectional view of the cap of FIG. 9, taken along line 11-11 of FIG. 9.

FIGS. 9-11 illustrate a second modular cap assembly 150. In addition to a cover portion 154, a threaded portion 158, a pawl member 162, a retainer 166, and a gasket 170, the cap assembly 150 includes a vent module 174 and a felt ring 178. The cover portion 154 snaps directly to the threaded potion 158 without a separate assembly ring. The cover portion 154 and the threaded portion 158 include respective projections 182 and 184 that engage one another to mate the cover the threaded portions 154 and 158. The felt ring 178 is positioned between the cover portion 154 and the threaded portion 158 along a flow passage between the outside of the cap assembly 150 and the inside of the threaded portion 158, allowing gases to pass through and preventing substantial passage of debris.

The pawl member 162 is engaged with the cover portion 154 to prevent substantial relative rotation between the pawl member 162 and the cover portion 154. Respective engagement portions 188 and 192 are provided on the cover portion 154 and the pawl member 162. The pawl member 162 includes pawl arms 196, each including a resilient portion 200 and an engagement portion 204. The engagement portions 204 engage pawl teeth 208 on the threaded portion 158. The engagement between the pawl member 162 and the threaded portion 158 is substantially the same as that described above with reference to the cap assembly 20 in that the pawl member 162 provides only a limited amount of torque to be transmitted to the threaded portion 58 in the cap-installing direction and does not limit the torque in the cap-removing direction.

The gasket 170 is held in place simply by engaging an annular wall 212 extending downwardly from the threaded portion 158. The retainer 166 is therefore not necessary for positioning the gasket 170, but it provides the opening 216 for attaching the tether assembly 28 shown in at least FIGS. 1, 2, 4, and 7. In the cap assembly 150 illustrated in FIGS. 9-11, an external tether 220 is assembled by snapping to the cover portion 154, which is provided with a mounting aperture 222. The retainer 166 includes a projection 224 (e.g., a barbed annular wall) for snapping onto the vent module 174. In some embodiments, the retainer 166 is structurally identical to the retainer 72 of the cap assembly 20, even though the retainer 72 engages directly with the threaded portion 32 and the gasket 76.

The vent module 174 consists of a vent member 28 having a vent aperture 232 therein. The vent member 228 has an engagement portion 234 that engages a projection 236 on the threaded portion 158 such that the vent member 228 may be welded to the threaded portion 158. Alternatively, the vent member 228 is simply snapped to the threaded portion 158, and in such a construction, an additional gasket may be provided. In a welded construction, alternative welding techniques (e.g., spin welding, ultrasonic welding, etc.) may be employed for coupling plastic or polymeric materials.

As discussed above with reference to the cap assembly 20 and as is discussed further below, various components of the cap assembly 150 may be directly substituted by alternate components and/or simply replaced (e.g., if worn or damaged) without replacing the entire cap assembly 150.

Figure 13:
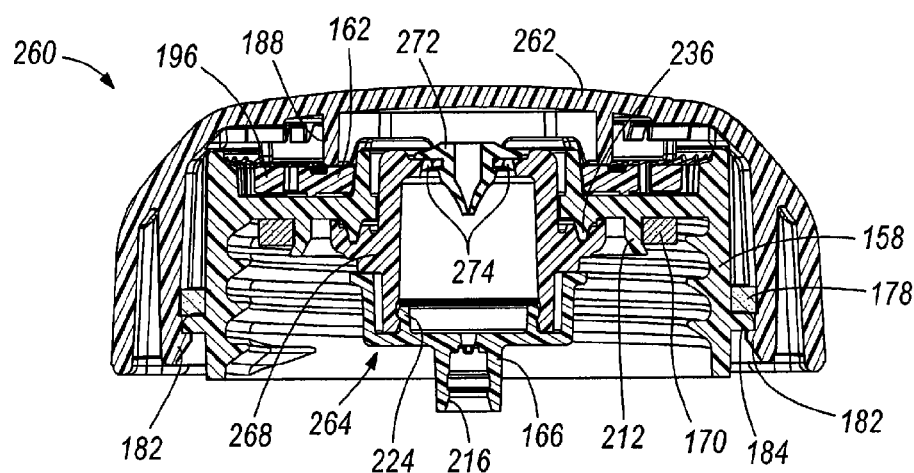
FIG. 13 is a cross-sectional view of the cap of FIG. 12, taken along line 13-13 of FIG. 12.
Figure 12:
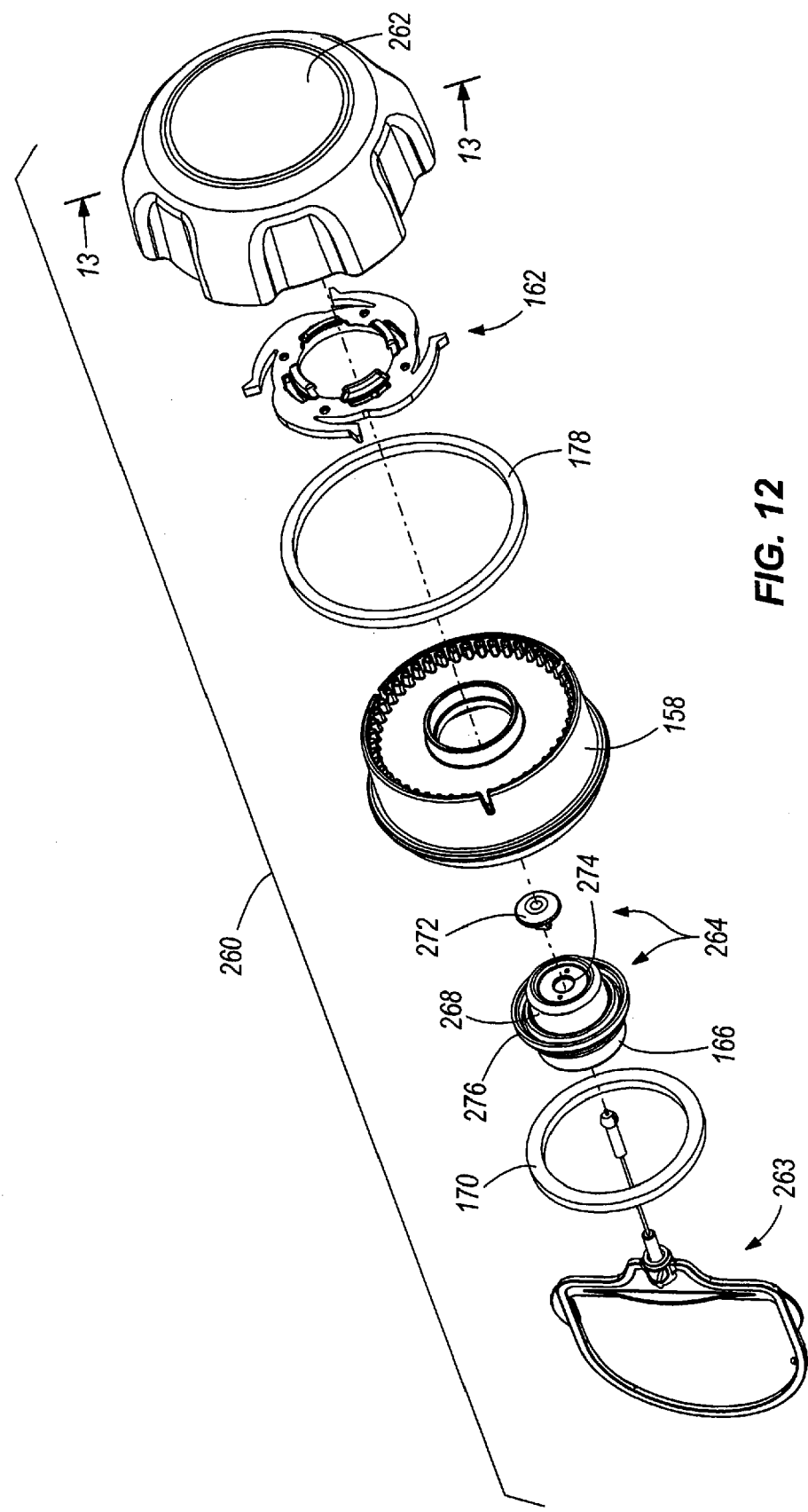
FIG. 12 is an exploded assembly view of a third modular ratchet cap construction having a second type of vent module.

FIGS. 12 and 13 illustrate a third modular cap assembly 260. The cap assembly 260 contains some identical components as those found in the second cap assembly 150. Such components are given identical reference numerals. The cap assembly 260 includes a cover portion 262, which does not feature the mounting aperture 222 found in the cover portion 154 of the cap assembly 150. The cap assembly 260 does not require means for mounting the external tether 220, but the cover portions 154 and 262 are easily interchanged if desired. Furthermore, if it is desired to give the option of changing from the internal tether assembly 263 to the external tether 220, the cover portion 154 may be provided in the cap assembly 260 instead of the cover portion 262.

The cap assembly 260 is provided with an alternate vent module 264, which replaces the vent module 174 shown with the cap assembly 150. The vent module 264 includes a vent member 268 and an umbrella valve 272. The umbrella valve 272 is operable to control the in/out flow of air thorough a pair of vent apertures 274 and through the flow passage of the cap assembly 260 between the inside of the threaded portion 158 and the outside of the cover portion 154. The vent member 268 includes an engagement portion 276 suitable for connection with the projection 236 of the threaded portion 158 and welding thereto. Alternatively, the vent member 268 and the threaded portion 158 are provided with mating projections for snapping together.

Figure 14:
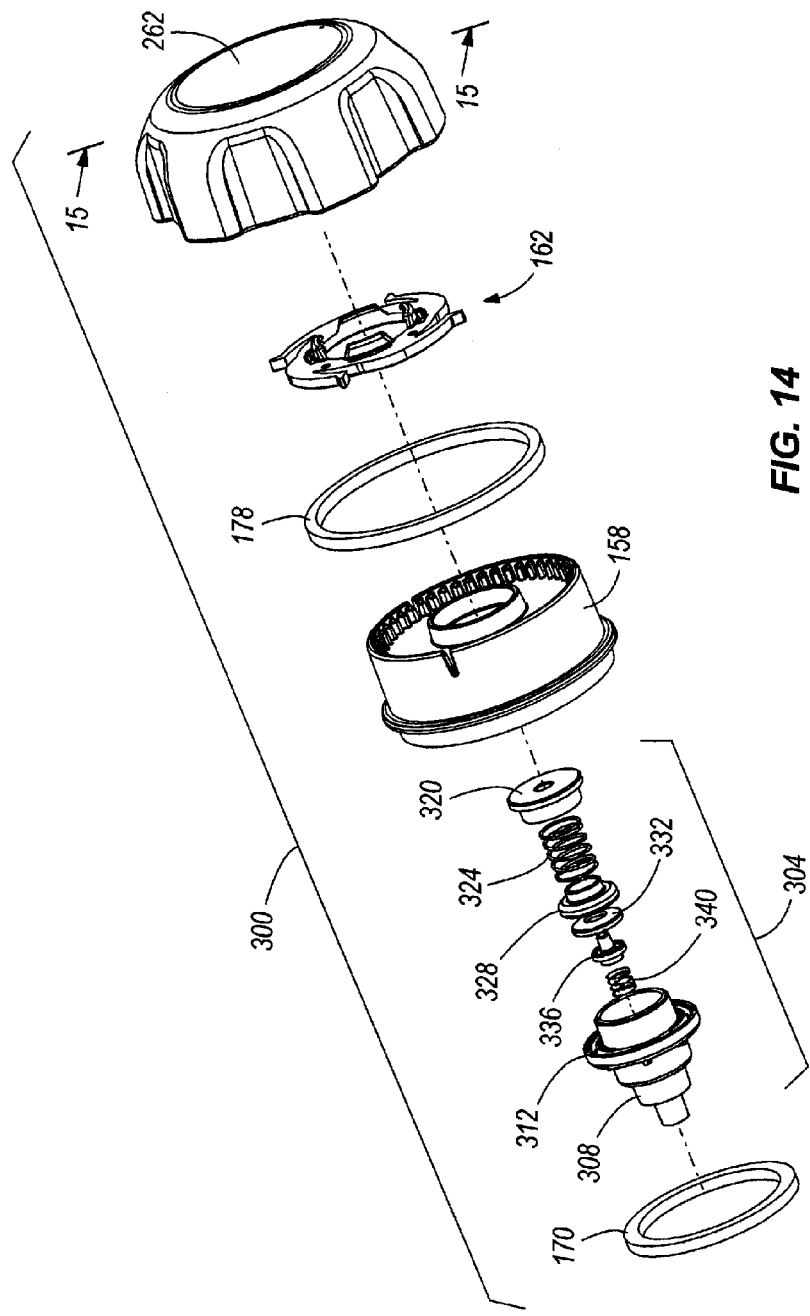
FIG. 14 is an exploded assembly view of a fourth modular ratchet cap construction having a third type of vent module.
Figure 15:
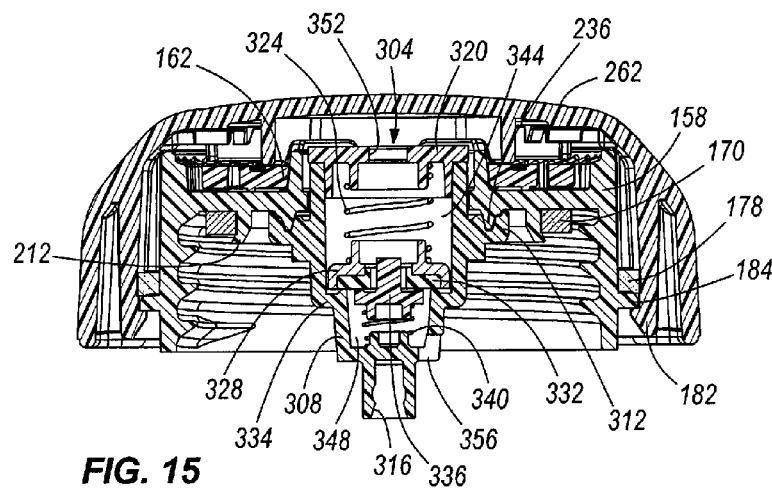
FIG. 15 is a cross-sectional view of the cap of FIG. 14, taken along line 15-15 of FIG. 14.

FIGS. 14 and 15 illustrate a fourth modular cap assembly 300 similar to the cap assemblies 150 and 260, but having a vent module 304. The cap assembly 300 is shown with the cover portion 262 in the exemplary construction, but the cover portion 154 is optional in place of the cover portion 262. Also, the cap assembly 300 is illustrated without a tether, but any suitable tether or tether assembly (e.g., including internal and eternal styles) may be added.

The vent module 304 includes a vent member 308 having an engagement portion 312 for attachment with the threaded portion 158. The engagement portion 312 fits together with the projection 236 of the threaded portion 158 in a manner suitable for welding the two components together. In an alternate embodiment, the vent member 308 may snap together with the threaded portion 158. The vent member 308 is provided with an opening 316 to receive a tether assembly (e.g., an internal-style tether assembly) if desired.

The vent module 304 includes a retainer plate 320, which retains one end of a pressure relief spring 324 inside the vent member 308. The opposite end of the pressure relief spring 324 is adjacent a valve retainer portion 328. Substantially set into the valve retainer portion 328 is a first valve element 332. The pressure relief spring 324 biases the valve retainer vent member 308. A second valve element 336 rests against a bottom portion of the first valve element 332. A vacuum relief spring 340 is positioned adjacent the second valve element 336 to bias the second valve element 336 toward the first valve embedment 332. Essentially, two seals are formed. A first seal exists between the first valve element 332 and the shoulder 334. A second seal is formed between the first valve element 332 and the second valve element 336. The seals are both annular and lie in a common plane. The seals divide the vent module 304 into a first chamber 344, in which the pressure relief spring 324 resides, and a second chamber 348, in which the vacuum relief spring 340 resides. A first vent passage 352, formed in the retainer plate 320, provides fluid communication between the first chamber 344 and the cap assembly 300. A second vent passage 355, formed in the vent member 308, provides fluid communication between the second chamber 348 and the inside of the threaded portion 158.

In the illustrated construction, the pressure relief spring 324 provides a stronger biasing force than that of the vacuum relief spring 340. Thus, at rest (i.e., zero pressure differential between the first chamber 344 and the second chamber 348) the pressure relief spring 324 biases the first valve element 332 closed against the shoulder 334, and the vacuum relief spring 340 biases the second valve element 336 closed against the first valve element 332. Positive pressure inside the threaded portion 158 (e.g., corresponding to a build-up of pressure within a tank associated with the cap assembly 300) and in communication with the second chamber 348 causes opening of the seal between the first valve element 332 and the shoulder 334. The amount of pressure required to open the seal is dependent upon the pressure relief spring 324, which in some embodiments is configured to compress and allow opening of the seal between the first valve element 332 and the shoulder 334 at a pressure of about 3.5 psi. Negative or vacuum pressure inside the threaded portion 158 (e.g., corresponding to a vacuum effect within a tank associated with the cap assembly 300) and in communication with the second chamber 348 causes opening of the seal between the second valve element 336 and the first valve element 332 as the second valve element 336 compresses the vacuum relief spring 340 and the first valve element 332 is held in position by the shoulder 334. The amount of vacuum pressure required to open the seal is dependent upon the vacuum relief spring 340, which in some embodiments is configured to compress and allow opening of the seal between the second valve element 336 and the first valve element 332 at a vacuum pressure of about 0.5 psi.

The cap assemblies 150, 260, and 300 are provided with respective vent modules 174, 264, and 304. Each of the vent modules 174, 264, and 304 includes a similarly-shaped engagement portion 234, 276, and 312, respectably. Therefore, any of the vent modules 174, 264, and 304 may be directly substituted for each other. When putting together a cap assembly, the threaded portion 158 may be mated to any one of the vent modules 174, 264, and 304 without requiring any special consideration for any of the other components of that particular cap assembly. Essentially, a cap may be assembled except for a vent module and then any one of the vent modules 174, 264, and 304 may be selected for that particular cap assembly. Choosing the vent module 174 completes a cap assembly 150 as shown in FIGS. 9-11. Choosing the vent module 264 completes a cap assembly 260 as shown in FIGS. 12 and 13. Choosing the vent module 304 completes a cap assembly 300 as shown in FIGS. 14 and 15.

Figure 16:
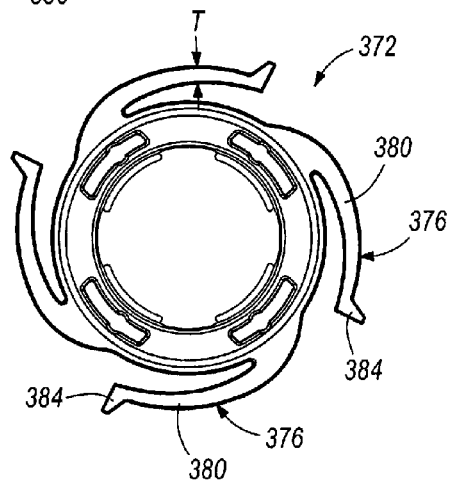
FIG. 16 is a top view of an alternate pawl member for optional direct replacement of the pawl members shown in at least FIGS. 9-15.

FIG. 16 is a top view of a pawl member 372 that is nearly identical to the pawl members 162 present in each of the cap assemblies 150, 260, and 300. The pawl member 372 includes pawl arms 376, each having a resilient portion 380 with a thickness T and an engagement portion 384, which is identical to the of the engagement portion 204 of the pawl member 162. The thickness T of the pawl member 372 is less than a corresponding thickness of the first pawl member 162. The thickness T affects the resilient performance (i.e., the flexibility) of the pawl arms 376, which in turn, affects the amount of torque that the pawl member 372 is able to transfer to the threaded portion 158 (i.e., the predetermined torque limit). The narrower resilient portions 380 of the pawl member 372 provide a predetermined torque limit that is less than that of the pawl member 162. The pawl member 372 may be directly exchanged with the pawl member 162 in any of the cap assemblies 150, 260, and 300 without necessarily changing any of the other components of the respective cap assembly. Another alternate way to create an interchange pawl member providing a different predetermined torque limit is to construct a pawl member out of a different material than the pawl member 162, which can provide a vastly different ratcheting performance, providing either lessor greater predetermined torque limits than that of the pawl member 162.

Figure 17:
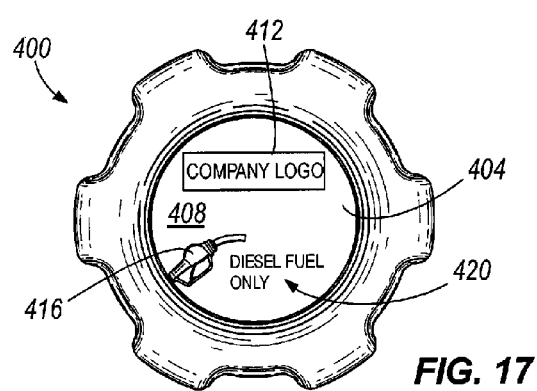
FIG. 17 is atop view of an alternate cover portion for optional direct replacement of the cover portions shown in at least FIGS. 9-15.

FIG. 17 illustrates a cover portion 400 that can be identical in general structure to either of the cover portions 154 and 262, and therefore, easily substituted for the cover portions 154 and 262 in the cap assemblies 150, 260, and 300. The cover portion 400 includes a portion 404 that is able to be removed and reinstalled on the cover portion 400 to provide exchangeability. The exchangeable portion 404 is generally circular and has an outer surface 408 with a company logo 412, symbol 416, and printed indicia 420 (i.e., indicating acceptable fuel type for the apparatus associated with the respective cap assembly). These are only exemplary forms of visibly individualizing the cover portion 400 by way of the exchangeable portion 404. The exchangeable portion 404 can alternately be provided as a specific color or colors that coordinate with an apparatus or designate fuel type, safety information, etc. Alternatively, the cover portions 154 and 262 that lack a removable or exchangeable portion, may be entirely exchangeable with another cover portion having symbols, printed indicia, color, etc. to be individualized to a particular application without necessarily effecting a change in any other component of the respective cap assembly.

What is claimed is:

1. A method of assembling selected cap assemblies, the method comprising the acts of:
   providing identical threaded portions;
   providing identical cover portions;
   providing a first vent module having a first vent member and a first mating portion for mating with one of a first one of the identical threaded portions and a first one of the identical cover portions;
   providing a second vent module having a second vent member different from the first vent member and a second mating portion for mating with one of a second one of the identical threaded portions and a second one of the identical cover portions, the first mating portion and the second mating portion being substantially identical;
   selecting the first vent module and coupling together the first vent module and the first one of the identical threaded portions and the first one of the identical cover portions to form a first cap assembly; and
   selecting the second vent module and coupling together the second vent module and the second one of the identical threaded portions and the second one of the identical cover portions to form a second cap assembly.

2. The method of claim 1, further comprising the acts of:
   snapping a first tether retainer to the first vent module;
   snapping a second tether retainer identical to the first tether retainer to the second vent module;
   coupling a first tether assembly to the first tether retainer; and
   coupling a second tether assembly different from the first tether assembly to the second tether retainer.

3. The method of claim 1, further comprising the acts of:
   providing a third vent module different from the first and second vent modules; and
   selecting the third vent module and coupling together the third vent module and one of the identical threaded portions and one of the identical cover portions to form a third cap assembly.

4. The method of claim 3, wherein the first vent module includes an open-vented aperture, the second vent module includes an umbrella valve, and the third vent module includes a two-way controlled valve.

5. The method of claim 3, further comprising:
   providing the third vent module with a third vent member and a third mating portion for mating with one of a third one of the identical threaded portions and a third one of the identical cover portions, the third mating portion being substantially identical to the first and second mating portions.

6. The method of claim 1, further comprising the act of assembling each one of the first cap assembly and the second cap assembly with additional components, all of the additional components being identical between the first cap assembly and the second cap assembly.

7. The method of claim 6, wherein the additional components include an identical pawl member in each of the first and second cap assemblies for providing identical torque-limited coupling between respective cover portions and threaded portions.

8. The method of claim 1, further comprising the act of welding each of the first and second vent modules to the respective identical threaded portions.

* * * * *